March 16, 1954   E. H. SMITH   2,672,187
TORCH TIP MOUNTING
Filed Oct. 1, 1949

INVENTOR.
ELMER H. SMITH
BY *Paul, Paul & Moore*
ATTORNEYS

Patented Mar. 16, 1954

2,672,187

UNITED STATES PATENT OFFICE 2,672,187

TORCH TIP MOUNTING

Elmer H. Smith, Minneapolis, Minn., assignor to Smith Welding Equipment Corporation, Minneapolis, Minn., a corporation of Minnesota Application October 1, 1949, Serial No. 119,126

1 Claim. (Cl. 158—27.4)

This invention relates to new and useful improvements in torch tips, in general, and more particularly to a novel sealing means therefor.

In the operation of a welding or cutting torch, it may become necessary, at times, to change tips in order to accomplish certain results, and it is therefore highly desirable that the tip be so secured in the torch head that it may readily and quickly be detached therefrom and another one substituted therefor with a minimum loss of valuable time, and to effect economy in operating costs. Torch tips as now commonly constructed, are provided with metallic seats which usually require the use of a wrench to manipulate the usual clamping member or nut in order that the tip may be forced into leaktight engagement with its seat in the torch head. While this may seem like a simple operation, it does require the use of a wrench, and should the wrench become mislaid or lost, valuable time may be lost before it is recovered.

One of the important objects of the present invention is to provide a simple, inexpensive mounting for a torch tip whereby the tip may be quickly secured in the torch head in sealtight relation thereto, by the simple manipulation of a clamping nut by the operator's hand, the construction of the sealing means being such that a leak-tight connection may be effected between the tip and torch head with a minimum of effort on the part of the operator, and without the use of a wrench.

A further object of the invention is to provide a torch tip having a resilient sealing element secured thereto and spaced inwardly from the rear end of the tip, said resilient sealing element being adapted to engage an annular seat on the adjacent end of the torch head whereby a slight axial movement of the tip relative to the torch head will cause the resilient sealing element to engage the seat on the torch head whereby leakage of fuel gases from the torch head is positively prevented.

A further object is to provide a torch tip comprising an elongated body provided at one end with a cylindrical end portion adapted to be received in a bore in a torch head, and the tip body being formed with an annular shoulder, and a collar being fitted onto the tip body in abutting engagement with said annular shoulder whereby the collar is retained in fixed position upon the tip body, and said collar having an annular cavity therein for supporting a resilient sealing element having one face exposed for engaging a seat on the end of the torch head when the tip is secured therein.

Other objects of the invention reside in the simple and inexpensive construction of the annular collar and the manner of securing it in fixed position on the tip body; in the unique mounting of the sealing element within the annular cavity or recess in said collar whereby it becomes firmly compressed therein to provide in effect an integral part of the tip; and in the formation of the annular raised seat provided at the end of the torch head and in the construction of the clamping element and its connection with the torch head, whereby the sealing element may readily be moved into sealtight engagement with the raised seat on the torch head by the operator, by simply rotating the clamping element with one hand.

These and other objects of the invention and the means for their attainment will be more apparent from the following description taken in connection with the accompanying drawings.

In the accompanying drawings there has been disclosed a structure designed to carry out the various objects of the invention, but it is to be understood that the invention is not confined to the exact features shown, as various changes may be made within the scope of the claim which follows.

Figure 3:
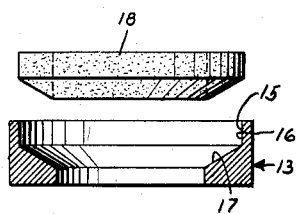
Figure 3 is a detail sectional view showing the sealing means detached from the torch tip.
Figure 1:
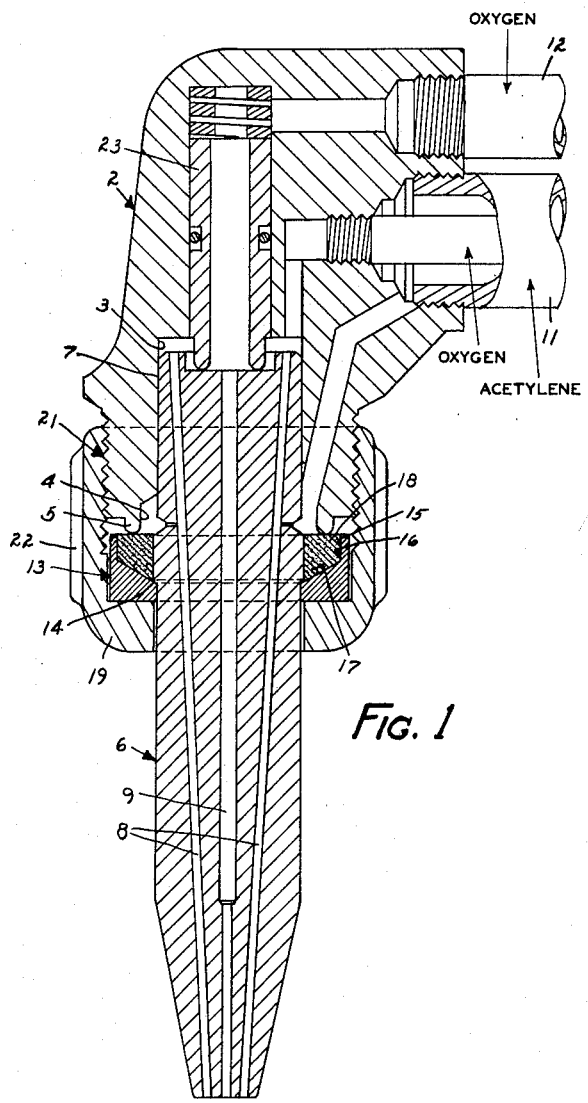
Figure 1 is an enlarged longitudinal sectional view of a torch tip showing it mounted in a torch head and embodying the novel sealing means herein disclosed.

In the selected embodiment of the invention herein disclosed, there is illustrated in Figure 1, a torch head generally designated by the numeral 2, shown provided with an enlarged bore 3 preferably outwardly flared or enlarged at its outer end to provide an annular fuel gas distributing chamber 4, and an annular seat 5, which encircles the open end of the bore 3. A tip, generally designated by the numeral 6, is shown provided with a cylindrical end portion 7 adapted to be received in the bore 3 of the torch head, as shown in Figure 1, when the tip is secured in the torch head.

The tip is shown provided with the usual preheating fuel passages 8 and a central oxygen passage 9, the rear ends of which are in communication with supplies of acetylene and oxygen delivered to the torchhead from suitable conduits 11 and 12, as is well known.

Figure 2:
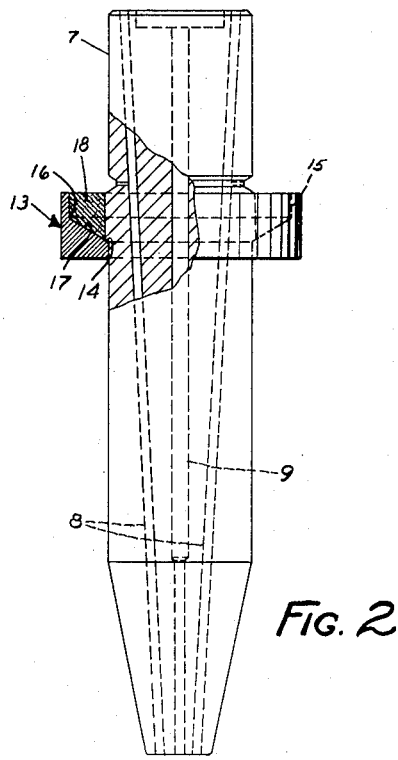
Figure 2 is an elevational view of the torch tip removed from the torch head and partially broken away to more clearly illustrate the construction of the sealing means.

An important feature of the present invention resides in the means provided for sealing the connection between the torch tip and the torch head to prevent leakage of the fuel gases to the atmosphere, when the torch is in operation. To thus seal the connection between the tip and torch head, an annular collar, generally designated by the numeral 13, is mounted on the tip body adjacent the forward end of the cylindrical end portion 7, as best shown in Figure 2. To secure the collar 13 against relative longitudinal movement on the tip body, an annular shoulder 14 is provided on the tip body against which the collar 13 is firmly pressed, when mounting it on the tip body. The bore in the collar 13 is preferably designed to provide a press fit on the tip body.

The collar 13 has an annular cavity 15 therein defined by a cylindrical wall portion 16 and a bottom wall 17, which is preferably cone-shaped, as illustrated in the application drawing. A resilient sealing element 18, made of a suitable resilient combustion proof material, is fitted into the cavity 15 and is firmly compressed therein as a result of the diameter of the tip body within the confines of the cavity being slightly larger in diameter than the diameter of the cylindrical end portion 7 thereof. The tip body 6, collar 13, and resilient sealing element 18 thus become, in effect, an integral part of the torch tip, when said parts are assembled on the tip body, as shown in Figure 2. It will also be noted that the collar 13 conceals all but one side face of the sealing element 18, whereby said element is not so vulnerable to damage, when the tip is detached from the torch head.

A suitable manually operable clamping nut 19, is shown completely enclosing the collar 13 of the tip, and has one wall engaging the outer radial wall of the collar and its opposite end portion threadedly engaging the adjacent end of the torch head, as indicated at 21 in Figure 1. The threads 21 are preferably of relatively fine pitch, whereby the clamping nut may readily be rotated to force the sealing element 18 into seal-tight engagement wtih the annular seat 5 of the torch head by the fingers of the operator. The periphery of the clamping nut is knurled or corrugated, as indicated at 22, to provide a convenient grasp for the operator's hand and whereby the clamping nut may readily be rotated to secure the tip in leak-tight position within the torch head, or to detach the tip therefrom, as will be understood.

By thus making it possible to quickly substitute one tip for another when necessary, without the use of a wrench, the operation of the torch may be expedited with the resultant reduction in the amount of time required to accomplish a given job.

The sealing element 18, as hereinbefore stated, may be constructed of any suitable material which will withstand high temperatures without losing its resiliency, and which is highly resistant to chemicals and other foreign matter with which it is likely to come in contact with.

The torch head herein illustrated on the drawings is similar to the one shown and described in my application, Ser. No. 67,116, filed December 24, 1948, now U. S. Patent 2,552,873 for Cutting Torches and as the present invention is directed more specifically to the sealing means on the torch tip 6, it is believed unnecessary to herein describe the head in detail. The tubular sealing member shown at 23 in Figure 1 is also disclosed in detail in the above mentioned pending application.

The unique formation of the sealing element, cross-sectionally, is important in that it is helpful to place the sealing element under compression within the cavity 15 of the collar 13, when the parts are assembled, as shown in Figure 1. The sealing element when pressed into the cavity 15 becomes firmly seated against the cone-shaped wall 17, the peripheral wall portion of the tip body within the cavity, and the cylindrical wall portion 16 of the collar 13, whereby it is firmly supported therein with one side exposed to engage the seat 5 on the adjacent end of the torch head. By pressing the collar 13 onto the tip body into engagement with the shoulder 14, and inserting the sealing element into the cavity 15 of the collar, as hereinbefore described, a very practical device results, which may readily be manufactured in quantity production at low cost, thereby to provide a composite tip which may readily be handled in the operation of interchanging or replacing without danger of damaging the effective surface of the sealing element.

The foregoing detailed description has been given for clearness of understanding only, and no unnecessary limitations should be understood therefrom, but the appended claim should be construed as broadly as permissible in view of the prior art.

I claim as my invention:

In a torch, the combination of a head and an elongated torch tip; said head having a cylindrical bore for receiving the torch tip, an annular raised seat projecting outwardly beyond the end of the head and encircling the open end of the bore and passages in the head for conducting oxygen and fuel gas to the torch tip; said torch tip having a cylindrical end portion adapted to be slidably received and rotatable in said bore, a plurality of fluid passages therein in communication with the passages in said head, an outwardly extending shoulder on said tip adjacent said cylindrical portion and intermediate the ends of said tip and an annular collar press fitted onto said tip and against said shoulder on the tip at the opposite side of the shoulder from the cylindrical end of the tip; said annular collar having an annular cavity therein opening toward the cylindrical end of said tip; said annular cavity in the collar being defined by the outer adjacent surface of the torch tip, a cylindrical inner wall in said collar spaced radially outward from the outer adjacent surface of the torch tip and extending therein from the end of the collar adjacent the cylindrical end of the tip, and a bottom portion in said collar extending between the inner end of said cylindrical inner wall and the locus of juncture between the annular shoulder on said tip and a portion of the annular collar press fitted against said shoulder: said cylindrical inner wall also being so spaced outwardly from the outer adjacent surface of the torch tip that said annular cavity extends beyond each side of said raised seat projecting outwardly beyond the end of the head; a resilient sealing element filling said cavity and having at least a portion of its exposed surface aligned for engagement with said projecting raised seat on the head; said cylindrical inner wall in the collar and said outer adjacent surface of the torch tip defining a portion of said cavity preventing radial expansion of said resilient sealing element; said tip, annular collar and resilient sealing element forming a unitary structure; and a hand-operated clamping member engageable with said collar on the torch tip and the torch head for forcing the resilient sealing element into leaktight engagement with said raised seat and permitting rotary adjustment of the tip in the head, whereby said torch tip may be rotatably adjusted in said head by hand loosening and tightening of said hand-operated clamping member and wherein said torch tip may be readily removed and replaced for leaktight engagement by another similar torch tip by hand manipulation of said hand-operated clamping member.

ELMER H. SMITH.

References Cited in the file of this patent

UNITED STATES PATENTS

| Number | Name | Date |
| --- | --- | --- |
| 981,342 | Williams | Jan. 10, 1911 |
| 1,751,447 | Campbell | Mar. 18, 1930 |
| 1,808,967 | Plumley | June 9, 1931 |
| 1,568,331 | Harris | Jan. 5, 1936 |
| 2,423,745 | Wolfram | July 8, 1947 |
| 2,428,143 | Chavayda | Sept. 30, 1947 |
| 2,431,120 | Howe | Nov. 18, 1947 |
| 2,475,026 | Hynes et al. | July 5, 1949 |

FOREIGN PATENTS

| Number | Country | Date |
| --- | --- | --- |
| 16,697 | Great Britain | of 1910 |
| 474,429 | Germany | Apr. 2, 1929 |